United States Patent
Baardse et al.

(10) Patent No.: US 9,697,303 B2
(45) Date of Patent: Jul. 4, 2017

(54) RULE-BASED CONSTRAINT INTERACTION IN GEOMETRIC MODELS

(71) Applicant: Siemens Product Lifecycle Management Software Inc., Plano, TX (US)

(72) Inventors: Dick Baardse, Geldermalsen (NL); Manoj Radhakrishnan, Pune (IN); Andrew Lomonosov, Cypress, CA (US); Steven Robert Jankovich, Buena Park, CA (US)

(73) Assignee: SIEMENS PRODUCT LIFECYCLE MANAGEMENT SOFTWARE INC., Plano, TX (US)

( * ) Notice: Subject to any disclaimer, the term of this patent is extended or adjusted under 35 U.S.C. 154(b) by 0 days.

(21) Appl. No.: 14/890,934

(22) PCT Filed: May 14, 2014

(86) PCT No.: PCT/US2014/037944
§ 371 (c)(1),
(2) Date: Nov. 13, 2015

(87) PCT Pub. No.: WO2014/189729
PCT Pub. Date: Nov. 27, 2014

(65) Prior Publication Data
US 2016/0117418 A1    Apr. 28, 2016

(30) Foreign Application Priority Data
May 22, 2013  (IN) .............................. 587/KOL/2013

(51) Int. Cl.
*G06T 13/00*    (2011.01)
*G06F 17/50*    (2006.01)

(52) U.S. Cl.
CPC .......... *G06F 17/50* (2013.01); *G06F 17/5086* (2013.01); *G06F 2217/06* (2013.01)

(58) Field of Classification Search
None
See application file for complete search history.

(56) References Cited

U.S. PATENT DOCUMENTS

| | | |
|---|---|---|
| 2009/0259442 A1 | 10/2009 | Gandikota et al. |
| 2010/0010655 A1 | 1/2010 | Corcoran et al. |

FOREIGN PATENT DOCUMENTS

| | | |
|---|---|---|
| JP | 04311272 A | 11/1992 |
| JP | 07152817 A | 6/1995 |

(Continued)

OTHER PUBLICATIONS

Eggli, et al., "Inferring 3D Models From Freehand Sketches and Constraints," Computer-Aided Design, Elsevier Publishers BV., Barking, GB, vol. 29, No. 2, Feb. 1, 1997 (pp. 101-112) XP004070873, 12 pages.

(Continued)

*Primary Examiner* — Xiao Wu
*Assistant Examiner* — Mohammad H Akhavannik

(57) ABSTRACT

Methods for constraining a geometric model and corresponding systems and computer-readable mediums. A method includes creating a rigid sketch group that includes some or all of the plurality of curves and receiving a user selection of first option rules or second option rules. The method includes editing the rigid sketch group according to the selected first option rules or second option rules. The method includes displaying the geometric model by the data processing system, including displaying the edited rigid sketch group.

20 Claims, 8 Drawing Sheets

(56) References Cited

FOREIGN PATENT DOCUMENTS

| JP | 09179994 A | 7/1997 |
|---|---|---|
| JP | 2011516999 A | 5/2011 |

OTHER PUBLICATIONS

Sohrt et al; "Interaction with Constraints in 3D Modeling," SMA '91 Proceedings of the First ACM Symposium on Solid Modeling Foundations and CAD/CAM Applications, ACM, New York, Jun. 5, 1991; XP040054129, 10 pages.
Van Der Meiden et al: "A Non-Rigid Cluster Rewriting Approach to Solve Systems of 3d Geometric Constraints," Computer Aided Design, Elsevier Publishers BV., Barking, GB vol. 42, No. 1, Jan. 1, 2010, XP026786549, 14 pages.
PCT Search Report dated Aug. 25, 2014, for PCT Application No. PCT/US2014/037944, 17 pages.
Japanese office action dated Dec. 20, 2016, for JP Application No. 2016-515360, 6 pages.

300

500

800

RULE-BASED CONSTRAINT INTERACTION IN GEOMETRIC MODELS

RELATED APPLICATIONS

This patent document claims priority under 35 U.S.C. §119 and all other benefits from PCT Application No. PCT/US2014/037944, filed May 14, 2014, which claims priority to Indian Provisional Application No. 587/KOL/2013, filed May 22, 2013, the content of which is hereby incorporated by reference to the extent permitted by law.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for constraining a geometric model and corresponding systems and computer-readable mediums. A method includes receiving a geometric model including a plurality of curves. The method includes creating a rigid sketch group that includes some or all of the plurality of curves and receiving a user selection of first option rules or second option rules. The method includes editing the rigid sketch group according to the selected first option rules or second option rules. The method includes displaying the geometric model by the data processing system, including displaying the edited rigid sketch group.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
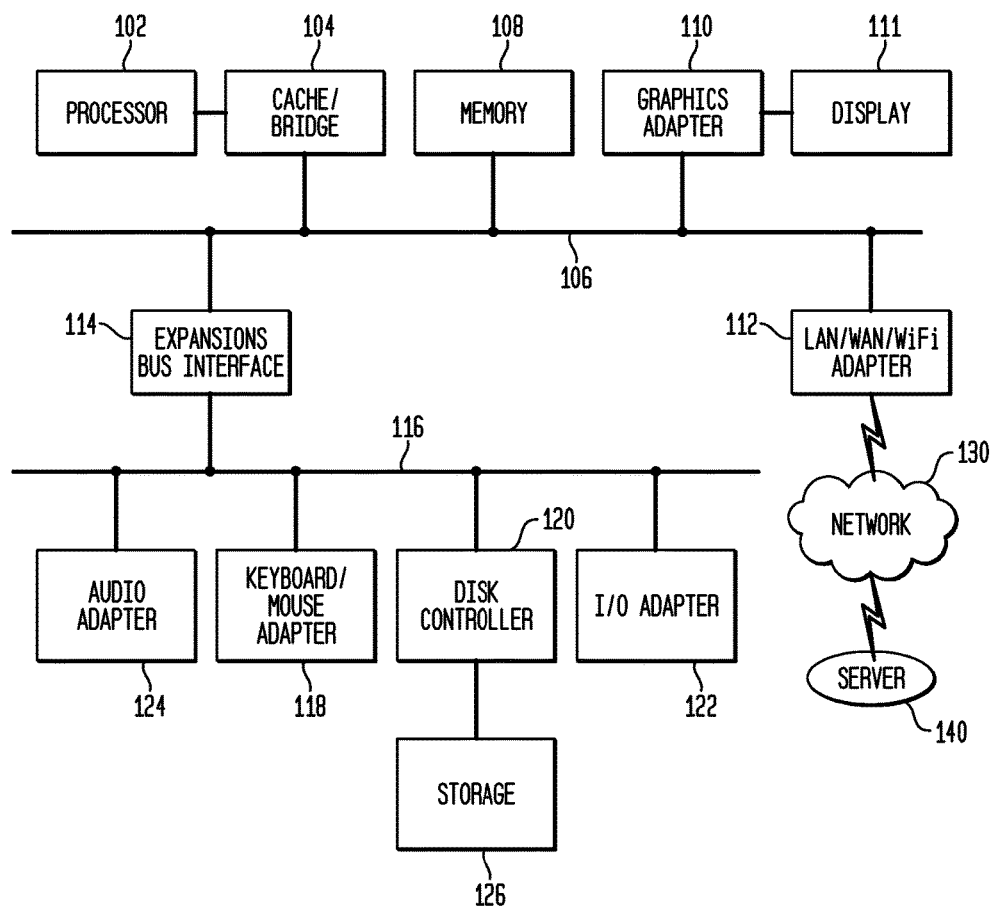
FIG. 1 depicts a block diagram of a data processing system in which an embodiment can be implemented.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Within a variational modeling system, changes are generally expressed variationally. A variational system describes the parameters of and relationships between features in an object model or set of curves in terms of geometric constraints and dimensions. Such systems then use a "solver" process to process these constraints and dimensions, along with a multitude of ancillary constraints and dimensions required to maintain design intent, and the entire model is solved simultaneously.

Disclosed embodiments introduce rule-based constraint interaction in geometric models, and in particular, can use rules enabling interaction between a rigid constraint and other sketch constraints. While the embodiments discussed below are described in terms of 2D sketch geometries, the disclosed techniques can be applied to 3D geometries, and in particular to 3D geometries that are located in a common plane.

A typical 2D sketch contains curves, dimensions, and geometric constraints. One constraint type is a "rigid" set constraint. A rigid constraint ensures that the curves that are participating in the constraint are frozen together as a rigid set of curves. The curves will not change shape and the curves will not move relative to each other.

A rigid constraint can be created on a set of curves that may already have other constraints (parallel, coincident etc.) as well as dimensions (reference, driving, or automatic). Disclosed embodiments describe techniques for managing a geometric model, 2D or 3D, using rules governing interaction between a rigid constraint and other sketch constraints.

These rules can prevent jumping of curves, preserve as much intent as possible (avoid deleting constraints and dimensions if possible).

The description below uses some specific terminology, set out below for convenient reference.

A "rigid set" describes a number of curves that are collected in a group that cannot move relative to each other. The constraint that is used to do this is called a "rigid set constraint." A "rigid sketch group" consists of rigid constraint and geometries of that constraint.

"Hybrid" constraints and dimensions refers to constraints that a user might place on a rigid set after it is created to control the position or orientation of the set, but which only reference geometry of the set. In various embodiments, the types of hybrid constraints and dimensions must be Fixed, Horizontal, Vertical, Horizontal Dimension, Vertical Dimension, or Constant Angle. These constraints could also be ignored because they only reference geometry from the set. Note that many operations described herein are performed on "constraints or dimensions;" such processes can be performed on any appropriate constraint, any appropriate dimension, or both, and the disclosed processes can handle each of these similarly.

"Internal" constraints and dimensions refer to constraints that cannot exist external to the rigid set when they only reference a rigid set geometry. Examples include Constant Length, Radius Dimension, Diameter Dimension, Equal Length, Equal Radius, Coincident, Concentric, Point on Curve, Tangent, Parallel, Perpendicular, Collinear, Parallel Dimension, Perpendicular Dimension, etc.

"External" constraints and dimensions refer to constraints that cannot be ignored because they reference geometry from the rigid set and geometry not in the rigid set.

"Ignored" constraints and dimensions refer to constraints or dimensions that are removed from the variational solver and saved until the group is activated or ungrouped, when they are reapplied. Typically, all Internal and most Hybrid constraints and dimensions become ignored when there is a rigid set constraint. Ignored constraints are not visible to the user.

"Preserved" constraints and dimensions refer to constraints or dimensions that are not ignored and are used to drive the sketch with the rigid set. Typically, External and some Hybrid constraints/dimensions are preserved.

An "Active" rigid sketch group—a rigid sketch group is made active then the rigid set constraint is ignored by the solver and the constraints inside the rigid sketch group become un-ignored.

An "Inactive" rigid sketch group—making a rigid sketch group inactive activates rigid set constraint. Constraints inside the rigid sketch group become ignored.

FIG. 1 depicts a block diagram of a data processing system in which an embodiment can be implemented, for example, as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments provide systems and methods that manage constraints between geometries in a PDM system. In particular, disclosed techniques can apply rules to manage interactions between rigid constraints and other constraints.

Figure 2:
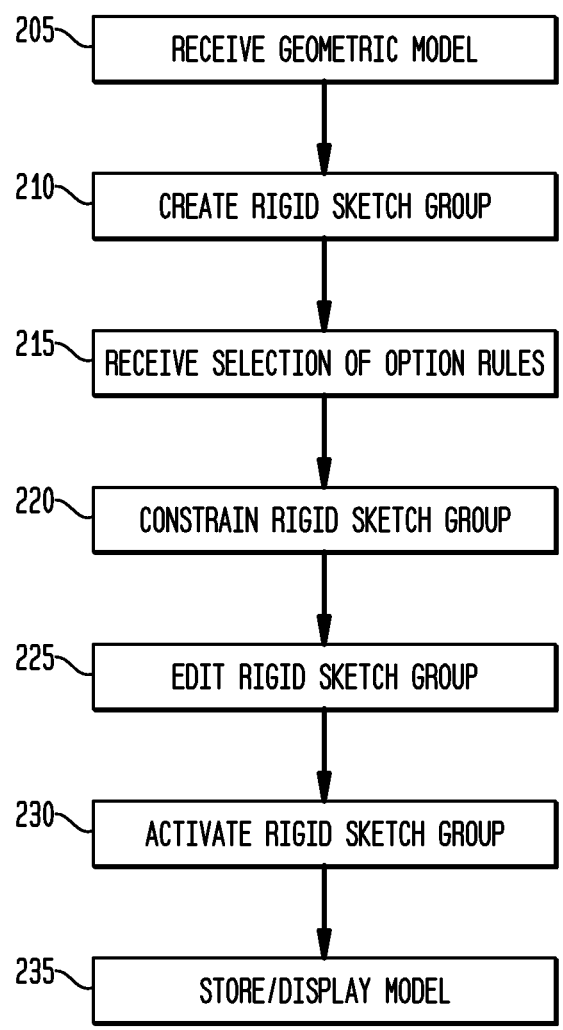
FIG. 2 illustrates a flowchart of a process in accordance with disclosed embodiments.

FIG. 2 illustrates a flowchart of a process in accordance with disclosed embodiments that may be performed, for example, by one or more PLM or PDM systems, referred to generically as "the system" below. This process and the related actions are described in terms of 2D sketch geometries, such as lines and other curves, but can be applied to other geometries, including 3D geometries, as well. The process illustrated in FIG. 2 includes a number of processes and subprocesses that may not each be performed in every case.

The process illustrated in FIG. 2 can apply rules using different options, each of which has associated rules. First option rules indicate that the system will preserve dimensions and constraints when possible and prevent new conflicts. The first option rules can be the default rules. When the first option rules are used, external constraints or dimensions that conflict are deleted or made only of reference (not applied). External constraints or dimensions that do not conflict are preserved. Hybrid constraints or dimensions are ignored. Internal constraints or dimensions are ignored.

Second option rules indicate that the system is to preserve all dimensions and constraints. When the second option rules are used, preserve external constraints can be chosen. In this case, external constraints or dimensions are preserved, even if they conflict. Hybrid constraints or dimensions are ignored. Internal constraints or dimensions are ignored.

All internal and hybrid auto-dimensions are part of the ignored set. If this is not done, the solver will delete them. The old set of constraints and dimensions can be stored so that they can be restored on activate/delete. In general, such elements do not have to be separately managed because they delete themselves on conflict or adjust their values automatically.

The system can receive a geometric model including a plurality of curves (205). "Receiving," as used herein, can include loading from storage, receiving from another device or process, or receiving via an interaction with a user.

The system can create a rigid sketch group from the plurality of curves (210). As part of this process, the system can display the geometric model to a user and receive a user selection of curves. The rigid sketch group can include some or all of the plurality of curves. The system can set the type of the selected curves to "rigid". The system can apply one or more of the definitions and options discussed above.

The system receives a user selection of option rules (215). This can be a selection of the first option rules or the second option rules. This step can include applying the selected option rules to the geometric model.

Figure 3:
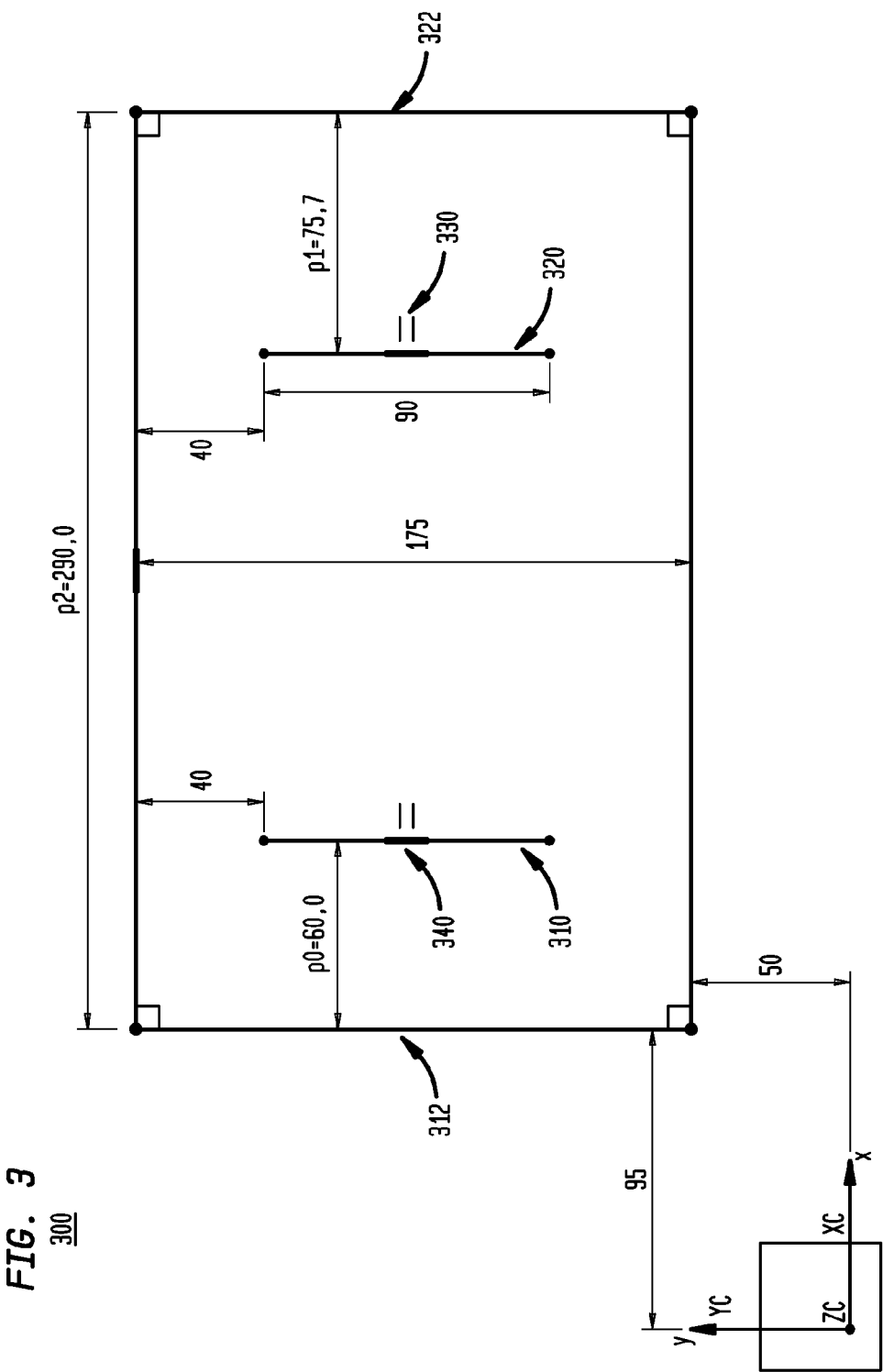
FIGS. 3-8 illustrate exemplary geometric models in the form of 2D sketches, including a plurality of curves, in accordance with disclosed embodiments.

FIG. 3 illustrates an exemplary geometric model 300 in the form of a 2D sketch, including a plurality of curves. In this example, lines 310 and 320 are being added to the model 300 as "floating" lines. They have respective constraints—line 310 has constraint p0 with reference to line 312, and line 320 has constraint p1 with reference to line 322.

Under the first option rules described above, both p0 and p1 are conflicting with the new set so they become reference dimensions. The Equal Length constraint between lines 310 and 320 (indicated by an equal sign as illustrated at 330) is Internal and the two Vertical constraints (indicated by a thicker bar as illustrated at 340) are Hybrid, so they all get ignored. The two auto dimensions (length 40, shown at the top of lines 310 and 320) conflict and are both removed. In the end, the set has three degrees of freedom and appropriate auto dimensions are created. The system need not attempt to figure out which of the conflicting set can stay. The system can clean up or remove all conflicting constraints or dimensions.

Under the second option rules described above, both p0 and p1 are preserved and conflict with the new set. The Equal Length constraint is Internal and the two Vertical constraints are Hybrid, so they all get ignored. The two auto dimensions (length 40) conflict and are both removed. Due to the conflict, the degree of freedom calculation and auto dimensioning cannot happen. The system can receive a user selection of one of the three driving dimensions to make reference, and when this is done, the set has two degrees of freedom and appropriate auto dimensions are created. The second option rules should be used if the intent of the user was to remove p2 and the conflicts happened to involve constraints instead of dimensions.

The system can constrain an existing rigid sketch group (220). As a part of this process, the system can receive, for example from a user, one or more dimensions or constraints on the rigid group members after the rigid group is created. If the constraint matches an ignored constraint, the system can create the new constraint and delete the ignored one. In such a case, the new constraint can "silently" replace the duplicate ignored constraint without notice to the user.

For the first and second option rules discussed above, any hybrid constraints or dimensions can be ignored. Typically only one or two constraints from this set are ever desirable as preserved constraints or dimensions. The system can receive a user selection of a replacement constraint or dimension for any hybrid constraint or dimension they wish to preserve, and the system will mark it as preserved. In some cases, the original Hybrid dimensions might have expressions that cannot easily transfer to the replacement. In these cases, the user can reference that original expression in the replacement dimension.

A constraint that is created will never go ignored immediately. It will be shown, even if it conflicts with the rigid set. All constraints and dimensions added to rigid set geometry while the group is not active are considered initially 'Preserved' in an editing process as described below.

The system can edit the rigid sketch group (225). This step can be performed according to the selected option rules. This process can include receiving a user input of an edit to be made to the rigid set of the geometric model. When the system receives a user indication that an edit process will be performed, the current set of preserved constraints or dimensions is cached for use later on. This can include External, Hybrid, and even (conflicting) Internal constraints or dimensions if these were created after the rigid group.

The system can receive a user edit to a selected set of curves such that the Preserved constraints/dimensions move to a new category. For example, external can become internal, when adding an additional curve to the rigid set, because now both objects that are referenced belong to the group.

When editing rigid group, the system can manage constraints by using the definitions above, with the changes noted here that incorporate the preserved constraints/dimensions.

If the first option rules as selected, if any conflicting External constraints/dimensions are in the preserved cache, they survive as preserved. Note that if there was a pre-existing conflict, it will persist after this edit. All other conflicting External constraints/dimensions can be deleted or made only of reference (not applied). If any Hybrid constraints/dimensions are in the Preserved cache, they survive as Preserved. All other Hybrid constraints/dimensions can be ignored. All Internal constraints/dimensions are ignored, whether or not they were in the Preserved cache.

If the second option rules are selected, if any hybrid constraints/dimensions are in the preserved cache, they survive as preserved. All internal constraints/dimensions are ignored, whether or not they were in the preserved cache. All external constraints/dimensions are preserved whether or not they were in the preserved cache and whether or not they conflict with the rigid constraint.

The system can receive a user change of the option state; e.g., the user can switch from the first option rules discussed above to the second option rules discussed above, and the edit process is performed based on the option state at the time the edit is received.

The system can activate the rigid sketch group (230). At activation, the currently preserved constraints are remembered for use when deactivating the group, whether or not a user dialog is used to activate the group. The system maintains the location and orientation of the curves in the rigid set on activation. That is, no curves of the rigid set should "jump" (translate or rotate) when the group activates.

All ignored constraints are evaluated to see if they still apply. If horizontal and vertical constraints are on lines that have rotated, they are converted to parallel and perpendicular constraints, if applicable. Horizontal dimensions and vertical dimensions are converted to parallel dimensions as needed and if possible with the expression value, otherwise become reference dimensions. All other ignored constraints are screened to see if they will cause their geometry to jump, since the user could have added the constraints after the rigid set and they were never solved. Any constraints that would cause a jump are deleted. Once converted or deleted, the constraints stay that way.

To revert back to the previous constraint scheme, the system can perform an UNDO operation. For example, the user creates a rigid set. User then adds an internal dimension with an incompatible value or a parallel constraint between two non-parallel lines. On activation, the system checks to see if the constraint is valid and preserves the respective constraints only if they are valid. An UNDO operation can reverse the Activation and restore the deleted constraints/dimensions Ignored hybrid constraints are also checked to see if they conflict with the Preserved constraints. If there is a conflict, the preserved constraint wins and the ignored hybrid constraint is deleted or made of reference, as appropriate.

If there was a pre-existing conflicting constraint situation inside the rigid set, that didn't involve the preserved constraints, and it survived the cleanup above, it will continue to exist after the group is activated and the user can sort it out. This situation will be extremely rare.

If there was a conflicting constraint situation outside (and including) the rigid set before the group is activated, it will involve the preserved constraints and may continue to exist until the user fixes it.

While the group is active, the user is free to create, edit, delete any curves, constraints, or dimensions as they desire.

The system can store or display the geometric model (235), including any rigid sketch group, constraints, dimensions, or other data discussed herein. The stored or displayed geometric model can reflect any edits or other changes as discussed herein.

The system can receive a user input to make a rigid sketch group the active sketch group. The user gets access to the internal data of the group and any new curves will be added to the group. At the same time it will be possible to create new constraints and dimensions with or between objects that are outside the group.

When the group is made active, the system displays any ignored constraints the rigid set constraint had ignored. The system "hides" any rigid constraint symbol that had been displayed.

The group now behaves as an active sketch group. Curves can be created and edited. The changes can be applied to the members, because the curves now behave like regular sketch curves that are part of a group.

If the user makes another group active, or deactivates this sketch group, the situation will be reversed. The rigid set constraint is reapplied and the constraint processing rule steps are executed as on creation.

When rigid set groups are nested and the lower level group is made active then this implies that the constraint on the owning group will also be deactivated. At the moment the system receives a user change to the lower level rigid sketch group content, this is similar to editing a member curve of the higher level group. This behavior cascades up multiple levels. A rigid sketch group A is inside B which is inside C. If Group A is made active then this will make the constraints and dimensions in B active (and its rigid set inactive), which then will make the constraints and dimensions that are internal to C active (and its rigid set inactive). A parent group is made unrigid as long as there is an active rigid sketch group below it.

When the active group is made inactive again then the parent groups return to their original rigid state.

Figure 4:
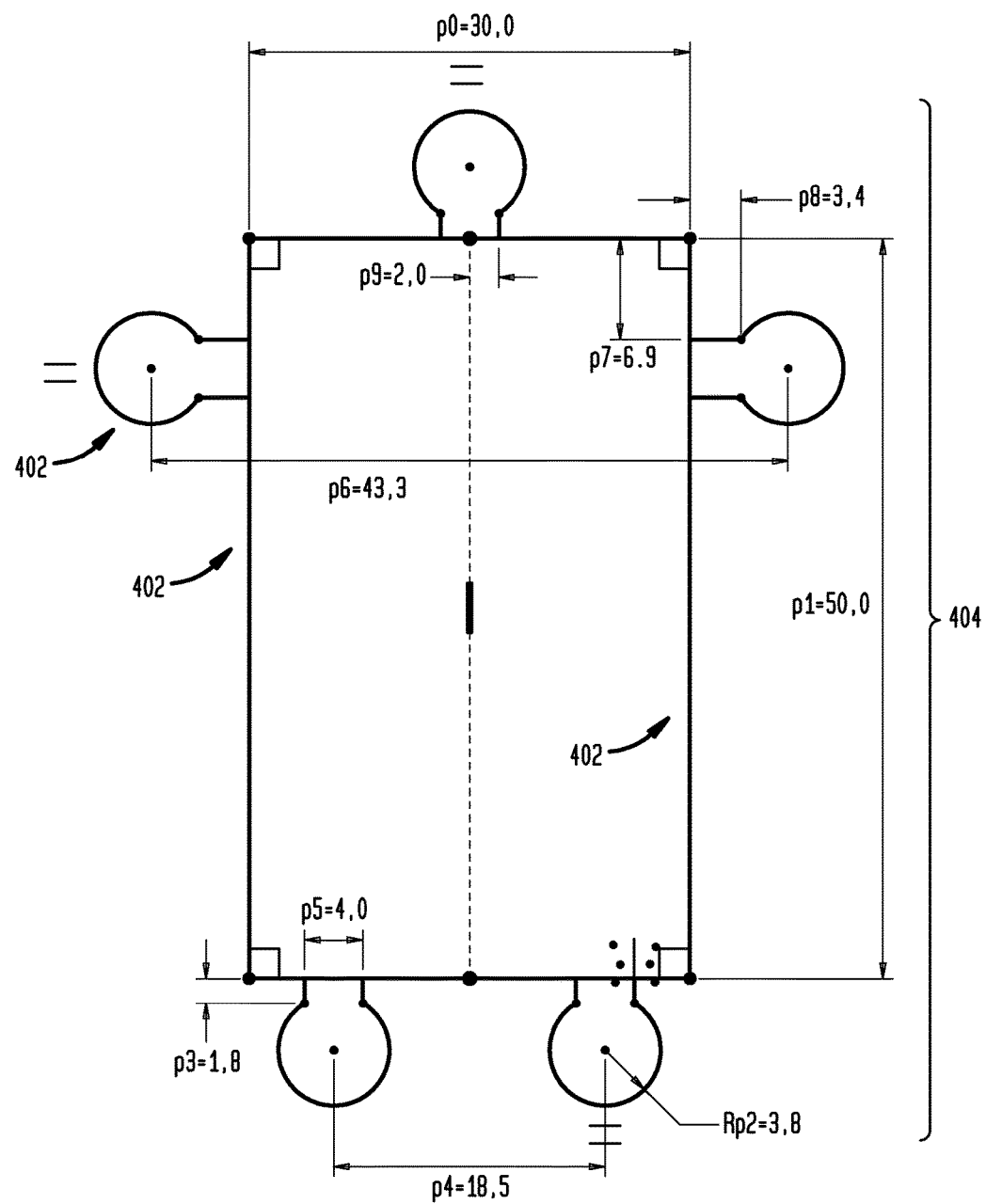

FIG. 4 illustrates an example of a geometric model 400 in the shape of a torso of a figure. This figure illustrates that the individual curves 402 (and others) in the model are constrained relative to each other, then the system can make the curve set rigid. The curves in the model as illustrated in FIG. 4 are designated as a rigid sketch group 404 as described above.

Figure 5:
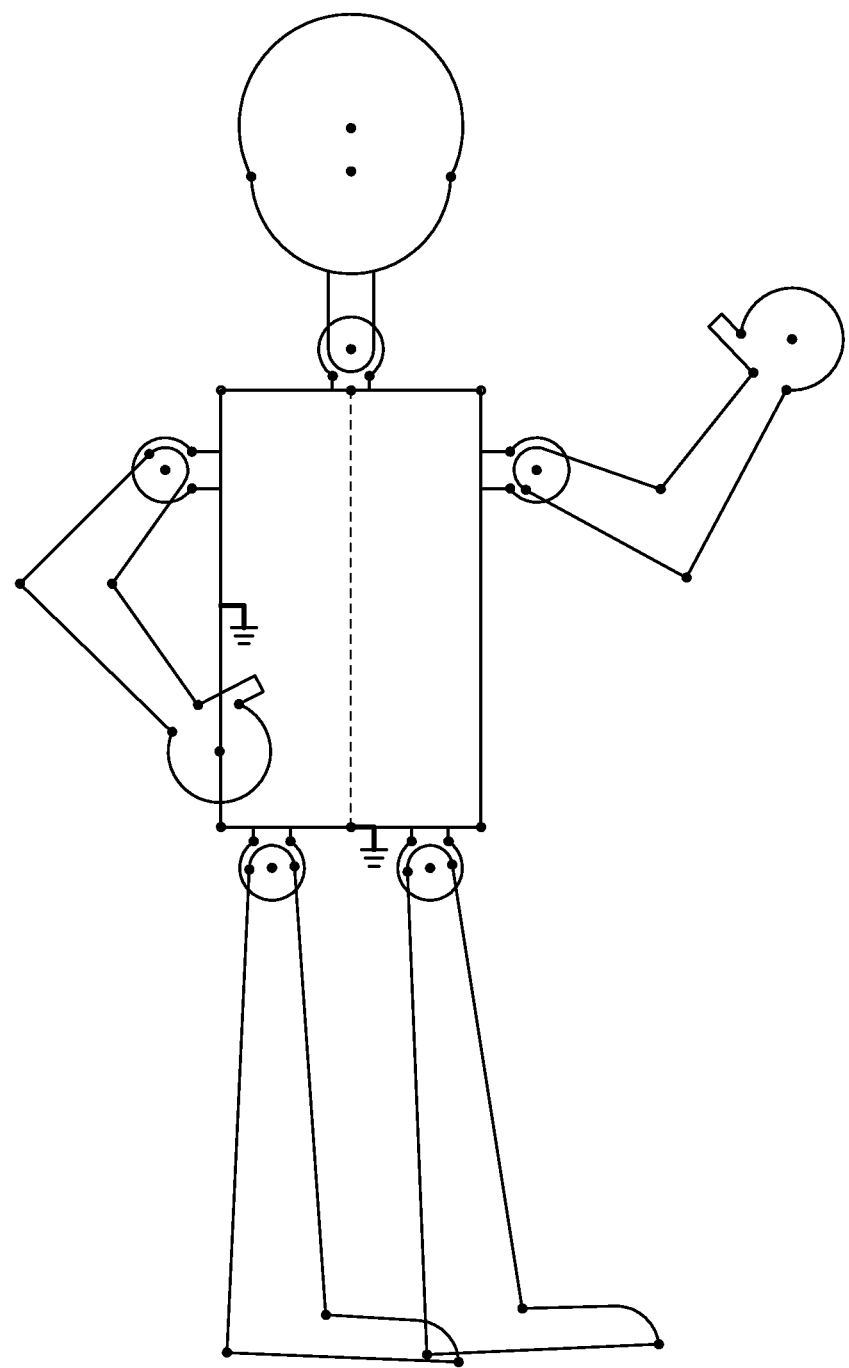

FIG. 5 illustrates an example of a geometric model 500, corresponding to the torso model 400, that includes additional rigid sketch groups. Each arm, each leg, and the head are all maintained as rigid sketch groups, and are then constrained to rotate about the pivot points of the torso rigid sketch group. As legs, arms, and head rotate about the pivot points, they remain rigid. This sketch only contains 7 constraints. The torso is fixed and the legs, arms and head can rotate around their pivot points as rigid objects.

Figure 6:
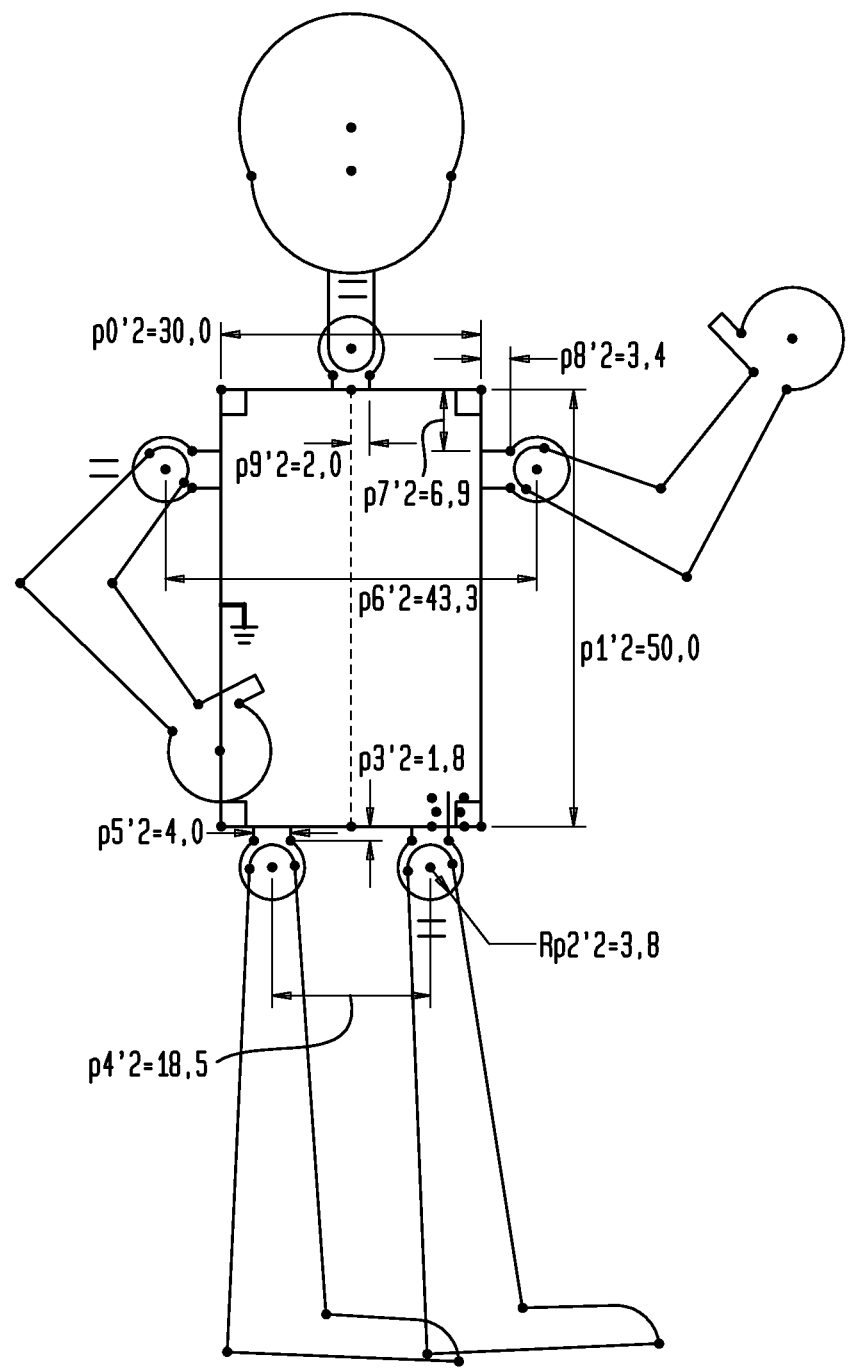

FIG. 6 illustrates an example of a geometric model 600, corresponding to the model 500, as may be displayed to a user when a rigid sketch group is active. In this example, the user has selected the torso rigid sketch group as the active group. The system responds by activating the torso rigid sketch group and displaying the internal constraints and allowing the user to make modifications.

Figure 7:
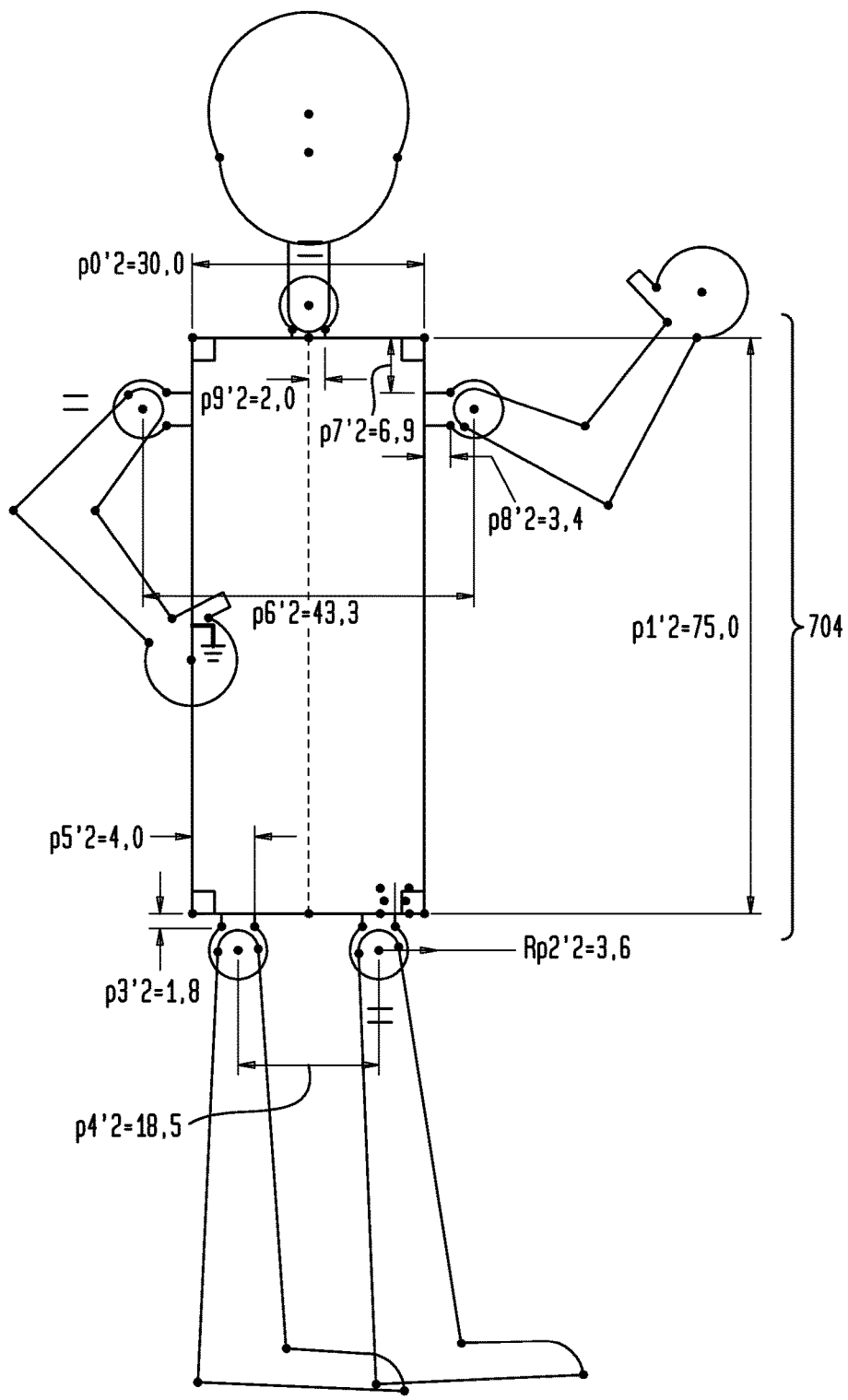

FIG. 7 illustrates an example of a geometric model 700, corresponding to the model 600, after a user modification to lengthen the torso. In this example, the user has selected the torso rigid sketch group 704 as the active group and changed the height/length dimension of the torso. The remainder of the torso rigid sketch group remains rigid. The other rigid sketch groups representing the arms, legs, and head remain rigid and constrained to the pivot points.

Figure 8:
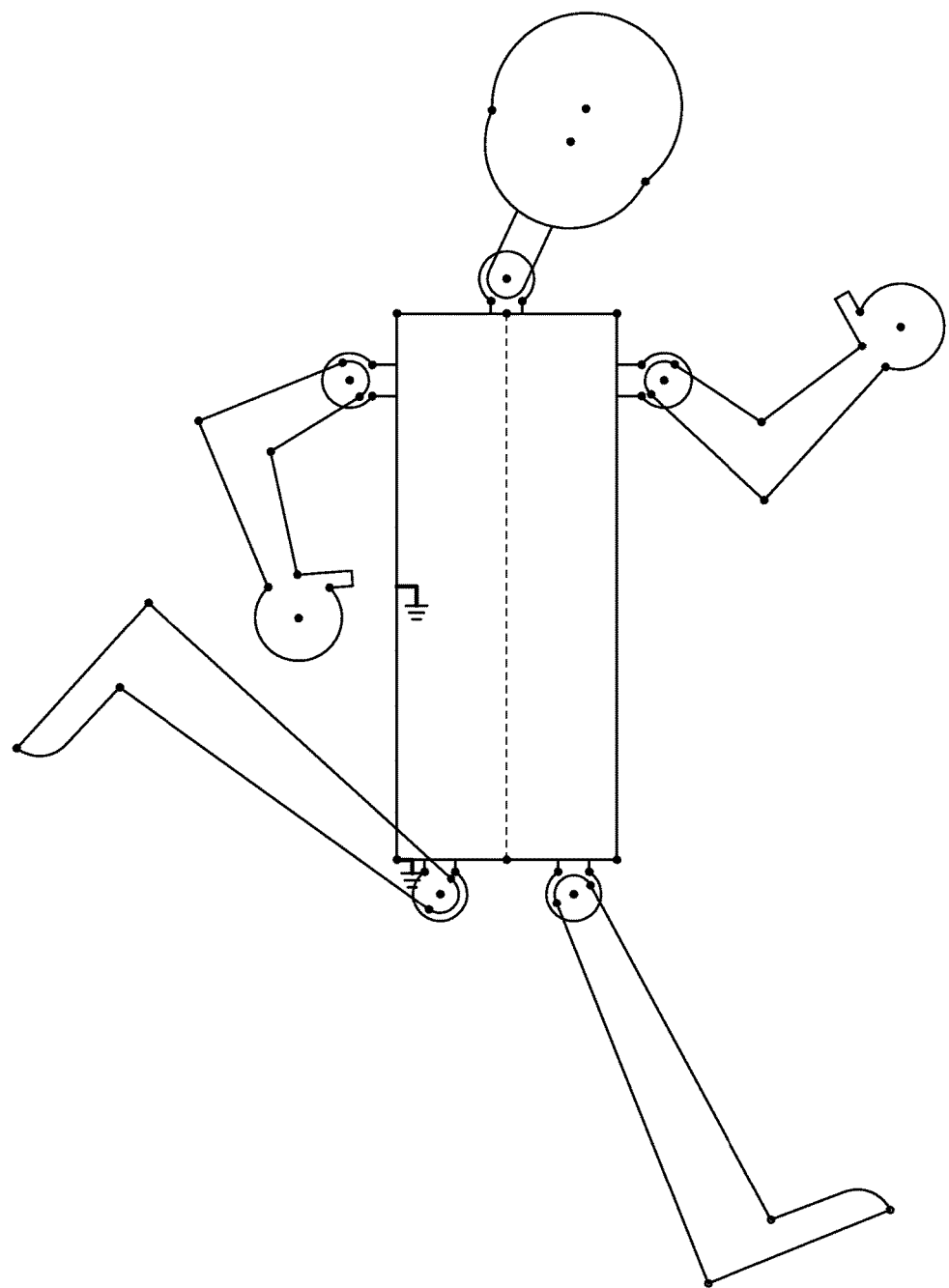

FIG. 8 illustrates an example of a geometric model 800, corresponding to the model 700, illustrating that the arm, leg, and head rigid sketch groups can rotate about the pivot points on the torso rigid sketch group. As they do, each rigid sketch group remains rigid.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for constraining a geometric model of a structure, the method performed by a data processing system and comprising:
   receiving, by the data processing system, a geometric model of a structure, which geometric model includes a plurality of curves;
   creating a rigid group, by the data processing system, that includes some of the plurality of curves and a rigid constraint that specifies that the curves of the rigid group cannot move relative to each other;
   enabling a user to provide a user selection from among first option rules and second option rules;
   receiving, by the data processing system, a user selection of first option rules or second option rules;
   editing the rigid group, by the data processing system, according to the selected first option rules or second option rules,
      wherein the data processing system is configured to:
         determine whether any external constraints or dimensions associated with curves of the rigid group have conflicts as a result of the rigid group,
         based on the selected first option rules, cause the conflicting external constraints or dimensions to be removed,
         based on the selected second option rules, preserve the conflicting external constraints or dimensions such that the conflicting external constraints or dimensions are not removed,
      wherein an external constraint or dimension specifies limitations on editing of a geometric relationship between at least one curve included by the rigid group and at least one curve external to the rigid group; and
   responsive to the editing of the rigid group, displaying through a display a visual representation of the geometric model of the structure by the data processing system, including displaying the edited rigid group with either an external constraint or dimension removed or preserved as a result of the editing of the rigid group.

2. The method of claim 1, wherein the first option rules are carried out by the data processing system such that external constraints or dimensions that conflict are not applied, external constraints or dimensions that do not conflict are preserved, hybrid constraints or dimensions that reference geometry of the rigid group as a set are ignored, and internal constraints or dimensions that only reference internal curves of the rigid group are ignored.

3. The method of claim 1, wherein the second option rules are carried out by the data processing system such that external constraints and dimensions that conflict are preserved, hybrid constraints or dimensions that reference geometry of the rigid group as a set are ignored, and internal constraints or dimensions that only reference internal curves of the rigid group are ignored.

4. The method of claim 1, wherein the curves included in the rigid group are set to rigid when the rigid group is created.

5. The method of claim 1, wherein the data processing system constrains the rigid group when the geometric model is being manipulated via inputs to the data processing system by a user.

6. The method of claim 1, wherein the data processing system activates the rigid group to enable user manipulation of location and orientation of the curves in of the rigid group with respect to each other, and when the rigid group becomes active the data processing system initially maintains a location and orientation for the curves of the rigid group with respect to each other and thereby prevents automatic movement of the curves based on constraints added after the rigid group was created.

7. The method of claim 1, wherein the geometric model is a two-dimensional model.

8. A data processing system comprising:
   a processor; and
   an accessible memory, the data processing system particularly configured to
      receive a geometric model of a structure, which geometric model includes a plurality of curves;
      create a rigid group that includes some of the plurality of curves and a rigid constraint that specifies that the curves of the rigid group cannot move relative to each other;
      enable a user to provide a user selection from among first option rules and second option rules;
      receive a user selection of first option rules or second option rules;
      edit the rigid group according to the selected first option rules or second option rules,
         wherein the data processing system is configured to:
            determine whether any external constraints or dimensions associated with curves of the rigid group have conflicts as a result of the rigid group,
            based on the selected first option rules, cause the conflicting external constraints or dimensions to be removed, based on the selected second option rules, preserve the conflicting external constraints or dimensions such that the conflicting external constraints or dimensions are not removed, wherein an external constraint or dimension specifies limitations on editing of a geometric relationship between at least one curve included by the rigid group and at least one curve external to the rigid group; and responsive to editing of the rigid group, display through a display a visual representation of the geometric model of the structure, including displaying the edited rigid group with either an external constraint or dimension removed or preserved as a result of the editing of the rigid group.

9. The data processing system of claim 8, wherein the first option rules are carried out by the data processing system such that external constraints or dimensions that conflict are not applied, external constraints or dimensions that do not conflict are preserved, hybrid constraints or dimensions that reference geometry of the rigid group as a set are ignored, and internal constraints or dimensions that only reference internal curves of the rigid group are ignored.

10. The data processing system of claim 8, wherein the second option rules are carried out by the data processing system such that external constraints and dimensions that conflict are preserved, hybrid constraints or dimensions that reference geometry of the rigid group as a set are ignored, and internal constraints or dimensions that only reference internal curves of the rigid group are ignored.

11. The data processing system of claim 8, wherein the curves included in the rigid group are set to rigid when the rigid group is created.

12. The data processing system of claim 8, wherein the data processing system constrains the rigid group when the geometric model is being manipulated via inputs to the data processing system by a user.

13. The data processing system of claim 8, wherein the data processing system activates the rigid group to enable user manipulation of location and orientation of the curves in of the rigid group with respect to each other, and when the rigid group becomes active the data processing system initially maintains a location and orientation for the curves of the rigid group with respect to each other and thereby prevents automatic movement of the curves based on constraints added after the rigid group was created.

14. The data processing system of claim 8, wherein the geometric model is a two-dimensional model.

15. A non-transitory computer-readable medium encoded with executable instructions that, when executed, cause one or more data processing systems to:

receive a geometric model of a structure, which geometric model includes a plurality of curves;

create a rigid group that includes some of the plurality of curves and a rigid constraint that specifies that the curves of the rigid group cannot move relative to each other;

enable a user to provide a user selection from among first option rules and second option rules;

receive a user selection of first option rules or second option rules;

edit the rigid group according to the selected first option rules or second option rules, wherein the data processing system is configured to:

determine whether any external constraints or dimensions associated with curves of the rigid group have conflicts as a result of the rigid group, based on the selected first option rules, cause the conflicting external constraints or dimensions to be removed, based on the selected second option rules, preserve the conflicting external constraints or dimensions such that the conflicting external constraints or dimensions are not removed, wherein an external constraint or dimension specifies limitations on editing of a geometric relationship between at least one curve included by the rigid group and at least one curve external to the rigid group; and responsive to editing of the rigid group, display through a display a visual representation of the geometric model of the structure, including displaying the edited rigid group with either an external constraint or dimension removed or preserved as a result of the editing of the rigid group.

16. The computer-readable medium of claim 15, wherein the first option rules are carried out by the data processing system such that external constraints or dimensions that conflict are not applied, external constraints or dimensions that do not conflict are preserved, hybrid constraints or dimensions that reference geometry of the rigid group as a set are ignored, and internal constraints or dimensions that only reference internal curves of the rigid group are ignored.

17. The computer-readable medium of claim 15, wherein the second option rules are carried out by the data processing system such that external constraints and dimensions that conflict are preserved, hybrid constraints or dimensions that reference geometry of the rigid group as a set are ignored, and internal constraints or dimensions that only reference internal curves of the rigid group are ignored.

18. The computer-readable medium of claim 15, wherein the curves included in the rigid group are set to rigid when the rigid group is created.

19. The computer-readable medium of claim 15, wherein the data processing system constrains the rigid group when the geometric model is being manipulated via inputs to the data processing system by a user.

20. The computer-readable medium of any of claim 15, wherein the data processing system activates the rigid group to enable user manipulation of location and orientation of the curves in of the rigid group with respect to each other, and when the rigid group becomes active the data processing system initially maintains a location and orientation for the curves of the rigid group with respect to each other and thereby prevents automatic movement of the curves based on constraints added after the rigid group was created.

* * * * *